United States Patent
Furman et al.

(10) Patent No.: US 8,787,432 B1
(45) Date of Patent: Jul. 22, 2014

(54) HF COMMUNICATION SYSTEM WITH DECODING OPERATIONS AND RELATED METHODS

(71) Applicant: Harris Corporation, Melbourne, FL (US)

(72) Inventors: William N. Furman, Fairport, NY (US); John W. Nieto, Rochester, NY (US); Eric N. Koski, Fairport, NY (US)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/803,174

(22) Filed: Mar. 14, 2013

(51) Int. Cl.
*H04B 1/38* (2006.01)

(52) U.S. Cl.
USPC .......................................................... 375/219

(58) Field of Classification Search
CPC ..... H04L 1/0007; H04L 1/004; H04L 1/0061; H04L 1/0072; H04L 1/0083; H04B 7/18582
USPC .......................................................... 375/219
See application file for complete search history.

(56) References Cited

U.S. PATENT DOCUMENTS

| | | | |
|---|---|---|---|
| 4,750,165 A | 6/1988 | Champagne et al. | |
| 5,455,570 A | 10/1995 | Cook et al. | |
| 5,559,796 A * | 9/1996 | Edem et al. | 370/412 |
| 5,845,085 A | 12/1998 | Gulick | |
| 5,881,073 A | 3/1999 | Wan et al. | |
| 5,930,685 A | 7/1999 | Straub | |
| 6,075,787 A * | 6/2000 | Bobeck et al. | 370/395.2 |
| 6,563,879 B1 * | 5/2003 | Anderlind et al. | 375/253 |
| 7,007,099 B1 | 2/2006 | Donati et al. | |
| 7,240,273 B2 | 7/2007 | Shien | |
| 7,451,381 B2 * | 11/2008 | Miller et al. | 714/774 |
| 7,477,694 B2 | 1/2009 | Sanderford, Jr. et al. | |
| 7,573,916 B1 * | 8/2009 | Bechtolsheim et al. | 370/542 |
| 7,705,777 B2 | 4/2010 | Sanderford, Jr. et al. | |
| 8,155,135 B2 | 4/2012 | Aloni et al. | |
| 2005/0273330 A1 | 12/2005 | Johnson | |
| 2007/0124144 A1 | 5/2007 | Johnson | |

OTHER PUBLICATIONS

Chamberlain et al., "A Scaleable Burst HF Modem," Proceedings of HF98, The Nordic Shortwave Conference, 1998, 15 pages.

* cited by examiner

*Primary Examiner* — Juan A Torres
(74) *Attorney, Agent, or Firm* — Allen, Dyer, Doppelt, Milbrath & Gilchrist, P.A.

(57) ABSTRACT

An HF communication system includes a first device, and a second device. The first device sends a message to the second device, the message including a preamble portion, a variable length data portion after the preamble portion having a given ending point selected from among potential ending points, and a check portion after the variable length data portion indicating an end of the message. The second device performs a decoding operation on the message at a potential ending point, and performs a check operation on a potential check portion of the decoded message, and when the check operation is successful, recovers the variable length data portion from the decoded message. Otherwise, the second device performs another decoding operation on the message at a next potential ending point, and performs another check operation on another potential check portion of the respective decoded message.

35 Claims, 6 Drawing Sheets

HF COMMUNICATION SYSTEM WITH DECODING OPERATIONS AND RELATED METHODS

FIELD OF THE INVENTION

The present invention relates to the field of wireless communications, and, more particularly, to high frequency wireless communications and related methods.

BACKGROUND OF THE INVENTION

A typical wireless communication system comprises a plurality of wireless communications devices exchanging data or voice data with each other. One example of a wireless communication system is a high frequency (HF) wireless communication system. The typical HF wireless communication system provides several benefits. For example, the HF wireless communication system offers potential worldwide communication capabilities with little to no infrastructure. Indeed, HF communication is popular with many amateur (HAM) radio operators, permitting one operator to readily contact another operator on another continent. The long range of HF wireless communication systems is the result of the desirable propagation characteristics of HF waves, resulting from their refraction by the Earth's ionosphere. However, HF communications can be detrimentally impacted by unfavorable ionospheric conditions. The conditions that may affect HF communications include, for example, sunlight/darkness at site of transmission and reception, season, solar sunspot cycle, solar activity, and polar aurora. In particular, these conditions can cause only some HF frequencies to be usable on a particular link; which frequencies are usable at any given time may be difficult to predict. Accordingly, the user may be forced to manually cycle through several frequencies to find a channel suitable for transmission.

A typical approach to this drawback in HF communication systems is automatic link establishment (ALE) methods. The ALE approach may typically include the transmitter device continuously scanning all available frequencies to determine corresponding quality-of-service (QoS) values for each frequency. Helpfully, the user of the HF communication system need not manually scan and evaluate the available frequencies. When a communication is initiated, the transmitter device selects the best available frequency for the desired transmission path.

Potential drawbacks to the ALE method may include lengthy link establishment times. For example, U.S. Pat. No. 5,930,685 to Straub discloses a method of ALE between two devices. This method inserts a 24-bit word in the call transmission for speeding up the link establishment. Moreover, even with ALE, the design of the typical HF wireless communication system may suffer from limited bandwidth, since existing ALE techniques lack capabilities to evaluate channels wider than 3 kHz, and to coordinate bandwidth selection between calling and called stations.

Another potential drawback to HF communications is difficulty encountered when the transmitting device has a low power transmitter, and/or a disadvantaged antenna. In these applications, the signal-to-noise ratio (SNR) at the receiver device may be quite poor, and the user may be limited to short messages that contain only digital data such as text characters, possibly having no latency requirements and low bandwidth. Effective use of the channel for communications may be limited to short messages containing textual data only, delivered on a best-effort basis without acknowledgement or Automatic Repeat reQuest (ARQ).

An approach by the present application's assignee to such a drawback has been to provide a spread HF 3 kHz waveform (Chamberlain, M, Furman, W. and Leiby, E, "A Scaleable Burst HF Modem", Proceedings of HF98, The Nordic Shortwave Conference). The waveform uses orthogonal Walsh symbol modulation combined with M-phase shift keying (PSK) or Gaussian minimum shift keying (GMSK).

An approach to this drawback may comprise the phase shift keying, 31 Baud (PSK31) protocol. The PSK31 protocol comprises coupling a typical personal computer to a transceiver, providing an audio tone from the computer, and outputting it to the transceiver. The computer switches the polarity of the signal used to key the computer's sound card, which may provide both amplitude and phase modulation of the carrier signal.

SUMMARY OF THE INVENTION

In view of the foregoing background, it is therefore an object of the present invention to provide an HF communication system that is efficient and robust.

This and other objects, features, and advantages in accordance with the present invention are provided by an HF communication system comprising a first HF radio communications device comprising a first HF radio transceiver and a first controller coupled thereto, and a second HF radio communications device comprising a second HF radio transceiver and a second controller coupled thereto. The first controller is operable with the first HF radio transceiver and configured to send a message to the second HF radio communications device. The message comprises a preamble portion, and a variable length data portion after the preamble portion and having a given ending point selected from among a plurality of potential ending points with each potential ending point being spaced apart from an adjacent potential ending point by a set quantity of digital data, such as, for example, a set number of bits or characters. The message also comprises a check portion after the variable length data portion indicating an end of the message. The second controller is operable with the second HF radio transceiver and is configured to perform a decoding operation on the message at a potential ending point, and perform a check operation on a potential check portion of the decoded message. The second controller is operable with the second HF radio transceiver and configured to recover the variable length data portion from the decoded message when the check operation is successful, and otherwise to perform another decoding operation on the message at a next potential ending point, and perform another check operation on another potential check portion of the respective decoded message.

Another aspect is directed to a method of operating an HF radio communications device communicating with another HF radio communications device. The other HF radio communications device sends a message comprising a preamble portion, a variable length data portion after the preamble portion and having a given ending point selected from among a plurality of potential ending points with each potential ending point being spaced apart from an adjacent potential ending point by a set quantity of digital data, such as, for example, a set number of bits or characters, and a check portion after the variable length data portion indicating an end of the message. The method comprises operating an HF radio transceiver and a controller in the HF radio communications device to perform a decoding operation on the message at a potential ending point, and perform a check operation on a potential check portion of the decoded message. The method comprises operating the HF radio transceiver and the controller to when the check operation is successful, recover the variable length data portion from the decoded message, otherwise perform another decoding operation on the message at a next potential ending point, and perform another check operation on another potential check portion of the respective decoded message.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring to FIGS. 1-3 and 5, an HF communication system 10 according to the present invention is now described. Also, with reference to flowcharts 30 & 80, which start at Blocks 31 & 81, respectively, a method of operating the HF communication system 10 is also now described. The HF communication system 10 includes a first HF radio communications device 11 comprising a first HF radio transceiver 12, a first controller 14 coupled thereto, and an HF antenna 13 coupled to the first HF radio transceiver.

Figure 1:
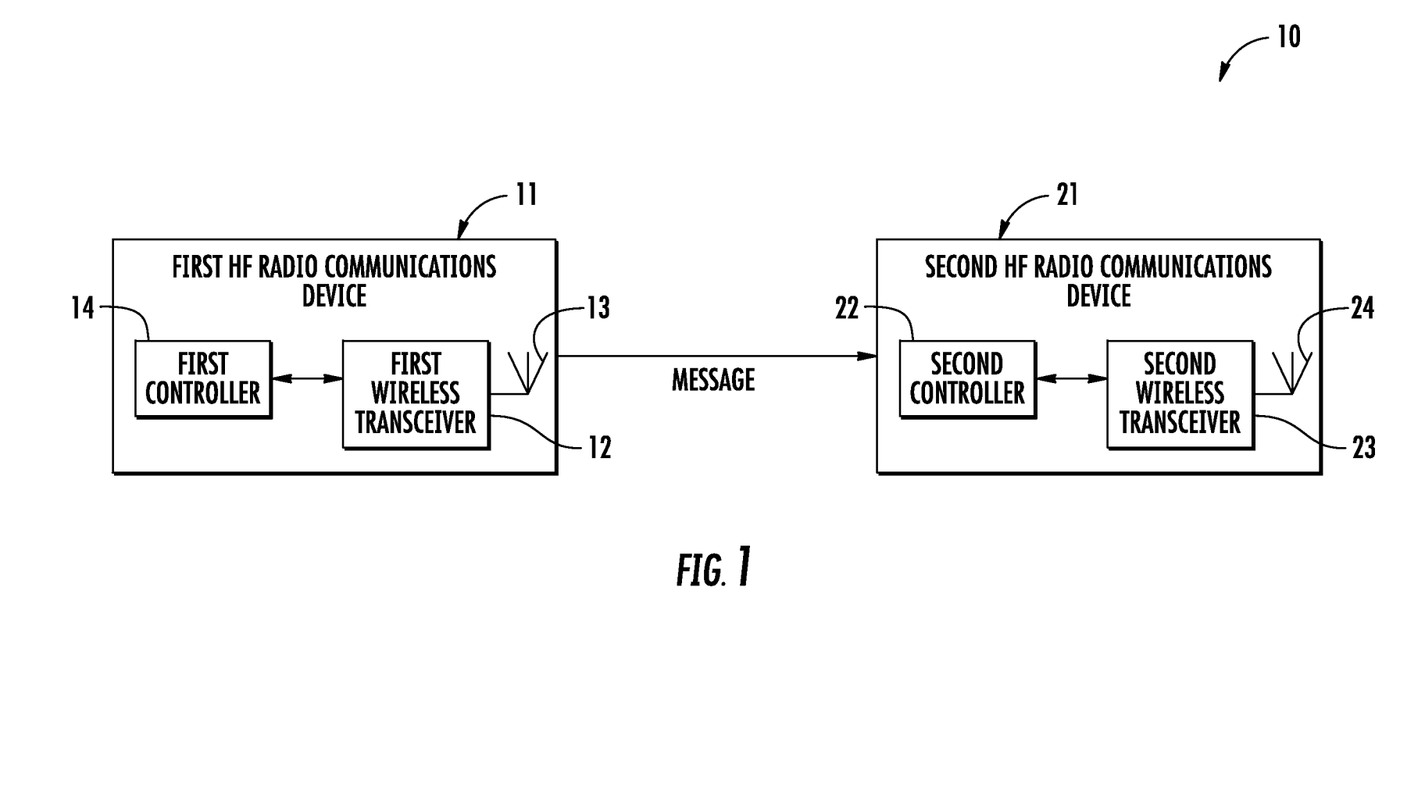
FIG. 1 is a schematic diagram of an HF communication system, according to the present invention.

The HF communication system 10 includes a second HF radio communications device 21 comprising a second HF radio transceiver 23, a second controller 22 coupled thereto, and an HF antenna 24 coupled to the second HF radio transceiver. One or both of the antennas 13, 24 may comprise less than optimum HF antennas, and one or both of the first and second HF radio transceivers 12, 23 may comprise low power transceivers. In short, the SNR of communications in the HF communication system 10 may be quite low.

The first controller 14 is operable with the first HF radio transceiver 12 and configured to send a message 50 to the second HF radio communications device 21 (Block 83). The message 50 (FIG. 5) comprises a preamble portion 51, and a variable length data portion 52 after the preamble portion and having a given ending point from among a plurality of potential ending points 53a-53f. In short, the message 50 must end at one of the established potential ending points 53a-53f. The number of established potential ending points 53a-53f can be quite large, making the message of arbitrary length. The first controller 14 is configured to generate the variable length data portion 52 comprising the message, which may comprise text communications, for example (other forms of communications may be included).

Figures 5, 6:
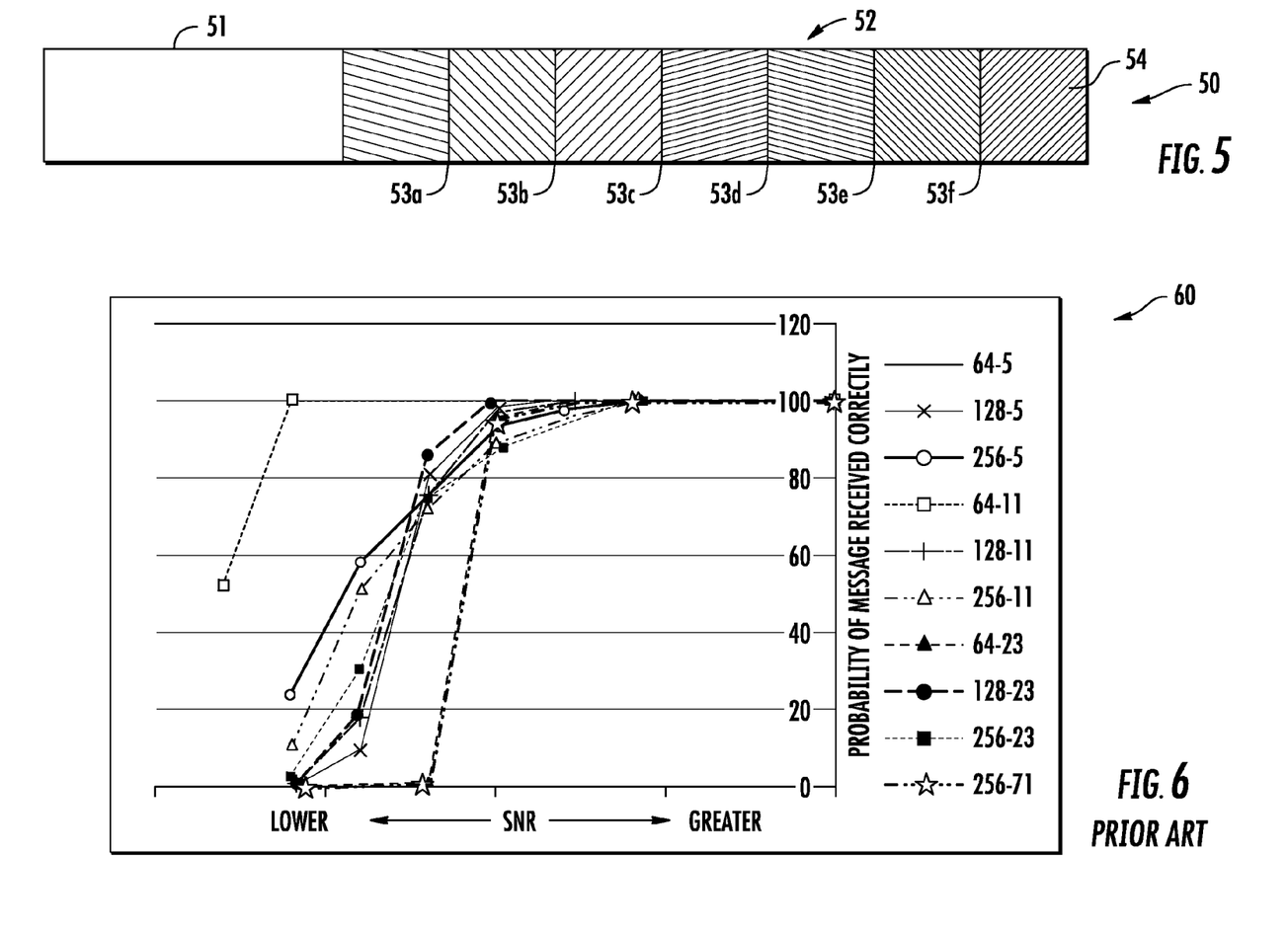
FIG. 5 is a schematic diagram of the frame structure of the message in the HF communication system of FIG. 1.
FIG. 6 is a chart illustrating performance of a communication system, according to the prior art.

In some embodiments, each of the potential ending points 53a-53f is spaced apart from the adjacent potential ending points a set quantity of digital data. The quantity of digital data may comprise, for example, a set number of characters or a set number of bits. In some embodiments, the potential ending points 53a-53f are spaced apart equal and uniform amounts, such as 20 characters (i.e. the message has a length of 20, 40, 60, 80, 100, 120, or 140). The first controller 14 may be configured to append null (0) characters to an end of the variable length data portion 52 so that the message 50 reaches the given ending point 53a-53f (Block 85). The message 50 includes a check portion 54 after the variable length data portion 52 indicating an end of the message. The check portion 54 may comprise a CRC portion. In particular, the message 50 may comprise up to 140 characters and with the addition of a CRC sequence of some number of bits, for example, 16 bits or 32 bits. In another embodiment, the message 50 may have a length of 560 characters, but this will increase the complexity of the decoding for the second controller 22.

In some embodiments (FIG. 4), the first controller 14 may be configured to sequentially repeat the variable length data and check portions 52, 54 (Block 87). This block is illustrated with shadowed lines since it is optional.

Figure 2:
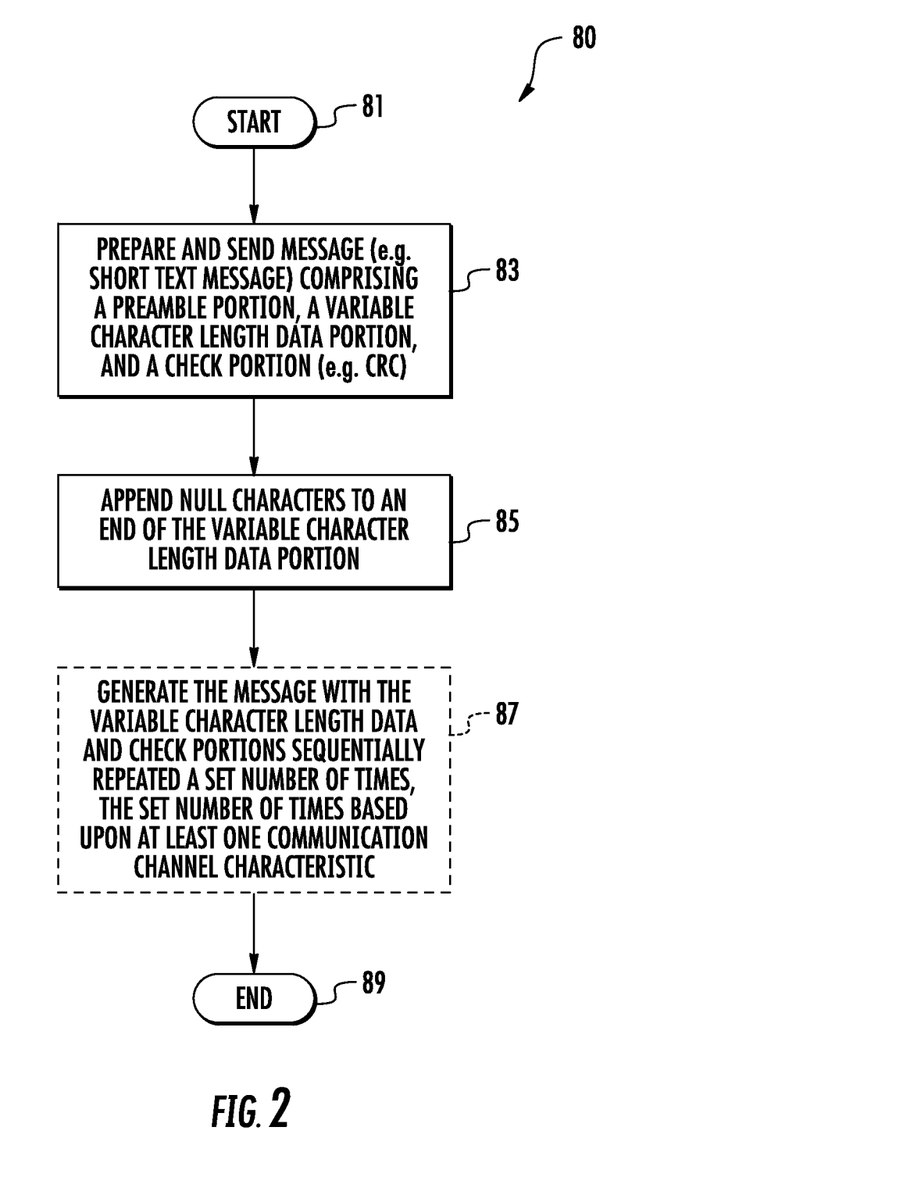
FIG. 2 is a flowchart illustrating operation of the first HF radio communications device of FIG. 1.

The first controller 14 is fashioning the message 50 to have an expected length based on one of the potential ending points 53a-53f. The second controller 22 is operable with the second HF radio transceiver 23 and configured to receive the message 50 and initially determine an estimated time alignment and estimated frequency offset of the message based upon the preamble portion 51 (Blocks 31, 33).

Figure 3:
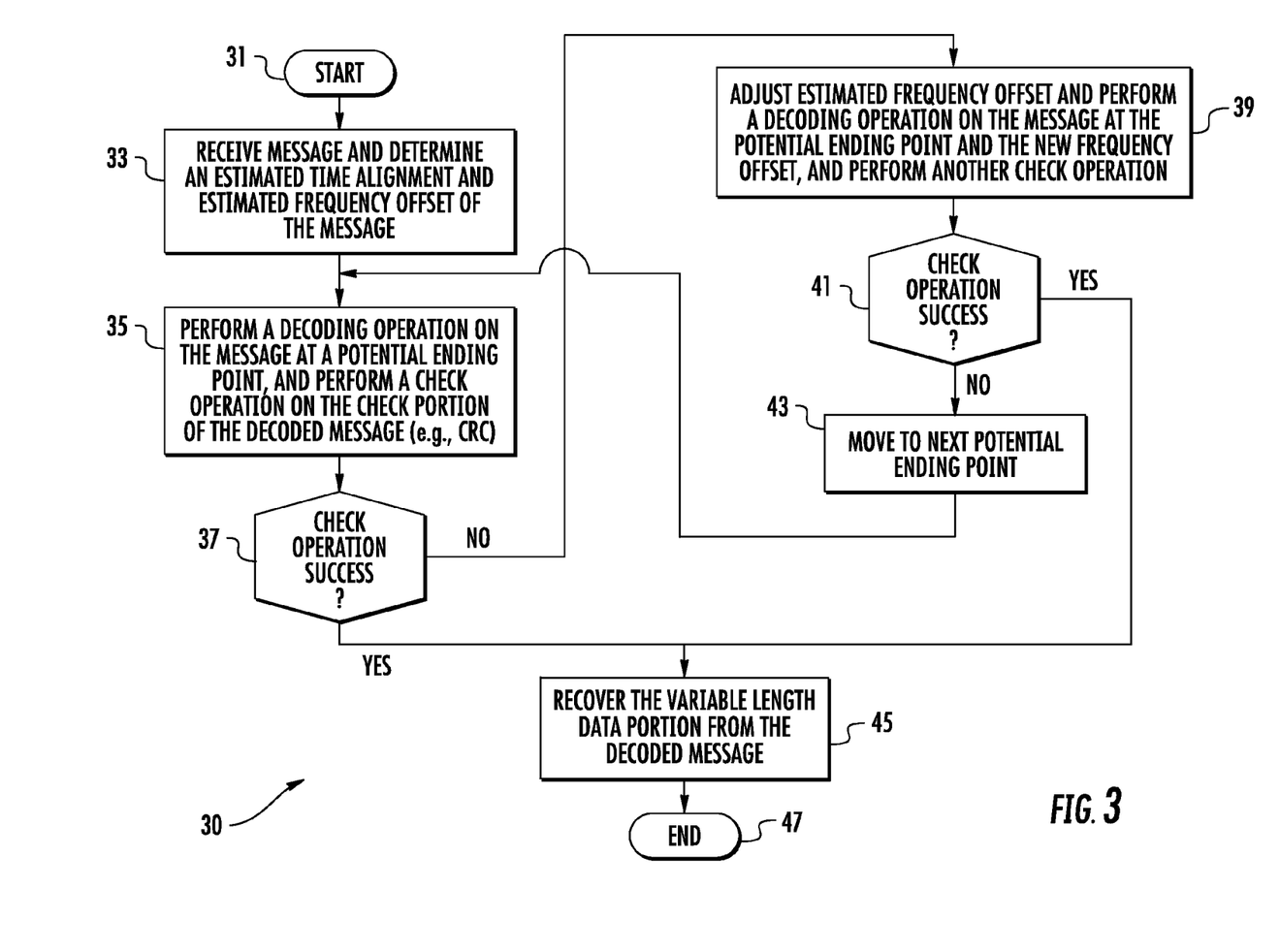
FIG. 3 is a flowchart illustrating operation of the HF communication system of FIG. 1.

The second controller 22 is operable with the second HF radio transceiver 23 and configured to perform a decoding operation on the message 50 at a first potential ending point 53a. In some embodiments, the decoding operation comprises a demodulation operation, a calculation of soft decisions on the demodulated signal at the first potential ending point 53a, a de-interleaving of the soft decisions, and an FEC decoding of the de-interleaved soft decisions with the object of recovering the message 50. The second controller 22 is operable with the second HF radio transceiver 23 is configured to perform a check operation (e.g. CRC operation) on a potential check portion of the decoded message (Block 35). The second controller 22 is operable with the second HF radio transceiver 23 and configured to when the check operation is successful (i.e. the CRC check sum is accurate), recover the variable length data portion 52 from the decoded message (Blocks 37, 45, & 47).

In other words, the message 50 actually ended at the first potential ending point 53a. For example, the second controller 22 may be configured to perform each decoding operation based upon an FEC decoding. Advantageously, the second controller 22 is determining the end of the message 50 by seeking the actual check portion 54.

If the first check operation fails, the second controller 22 is operable with the second HF radio transceiver 23 and configured to adjust the frequency offset estimation and perform another decoding operation on the message 50 at the first potential ending point 53a (Block 39), and perform another check operation on the potential check portion of the respective decoded message (Block 41). The quality of the frequency offset estimate may decrease with requisite decreases in SNR at the second HF radio communications device 21.

The second HF radio communications device 21 compensates for this by trying multiple frequency offsets.

In some embodiments, the second controller 22 may attempt a plurality of varying frequency offset estimates at the first potential ending point 53a, such as +/−5 Hz and +/−10 Hz, and retrying the decode and check operations at each frequency offset. In other words, the second controller 22 would first attempt the decode and check operations at the initial estimated frequency offset, and then attempt it 4 more times at +/−5 Hz and +/−10 Hz increments, relative to the initial estimated frequency offset. If any of these check operations are successful, the second controller 22 would proceed to recover the variable length data portion 52 from the decoded message using one of the new hypothesized frequency offsets (Blocks 45, 47, 89). If every one of the check operations for the first potential ending point 53a fails, the second controller 22 would move to the next potential ending point 53b in the message and perform another decoding operation on the message 50 at the next potential ending point 53a-53f, and perform another check operation on another potential check portion of the respective decoded message (Blocks 43, 35, & 37). Of course, if these decode and check operations fail, the second controller 22 would again vary the frequency offset estimates at the second potential ending point 53b and if that again failed, move on to the third potential ending point 53c and repeat the above steps.

Figure 4:
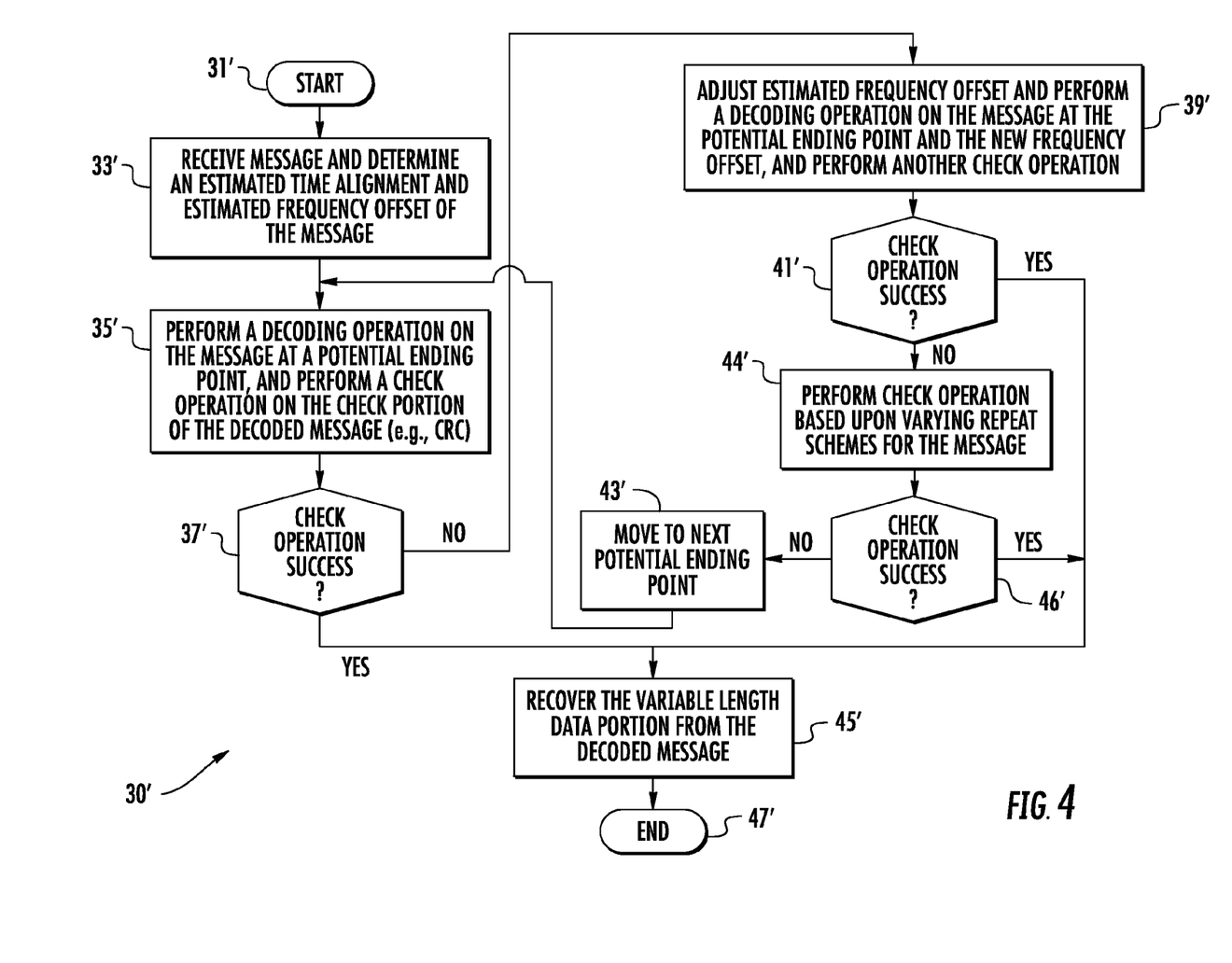
FIG. 4 is a flowchart illustrating operation of another embodiment of the HF communication system of FIG. 1.

Referring now additionally to FIG. 4, another embodiment of a method of operating the HF communication system 10 is now described with reference to flowchart 30'. In this embodiment of the method, those steps already discussed above with respect to FIG. 3 are given prime notation and most require no further discussion herein. This embodiment differs from the previous embodiment in that the first controller 14 is configured to generate the message 50 with the variable length data and check portions 51-52 sequentially repeated a set number of times. The first controller 14 is configured to determine the set number of times based upon a plurality of communication channel characteristics (e.g. previous experience, and handshake with base station). The second controller 22 is configured to perform a plurality of decoding operations on the message, each decoding operation being performed based upon the variable length data and check portions being sequentially repeated a respective number of times. (Blocks 44', 46', & 43'). In other words, the second controller 22 must attempt the decoding operation a plurality of times, each operation assuming a certain repeating pattern.

In other words, the data portion of the frame is repeated, the determination of the repeating scheme being performed at the first HF radio communications device 11. The repeating scheme is an unknown to the second HF radio communications device 21. For Example, several repeating schemes are listed herein: 20 Character Message: F1:F1:F1:F1:F1 . . . ; 40 Character Message: F1:F2:F1:F2:F1:F2 . . . ; 60 Character Message F1:F2:F3:F1:F2:F3:F1:F2:F3 . . . .

Since the data is the same from one repetition to the next, the second controller 22 may compute a plurality of FEC soft decisions for each message. The second controller 22 may properly scale the soft decisions and combine them (i.e. add them together) before decode.

Accordingly, the second HF radio communications device 21 must attempt a plurality of decoding variants for each potential ending point. For example, the second HF radio communications device 21 may try the following decoding operation variants: after 20 Char RX: simple decode; after 40 Char RX: simple 40 Char decode, followed by 20+20 Combined decode; after 60 Char RX: simple 60 char decode, 20+20+20 decode; and after 80 Char RX: simple 80, 20+20+20+20, 40+40 . . . .

Figure 7:
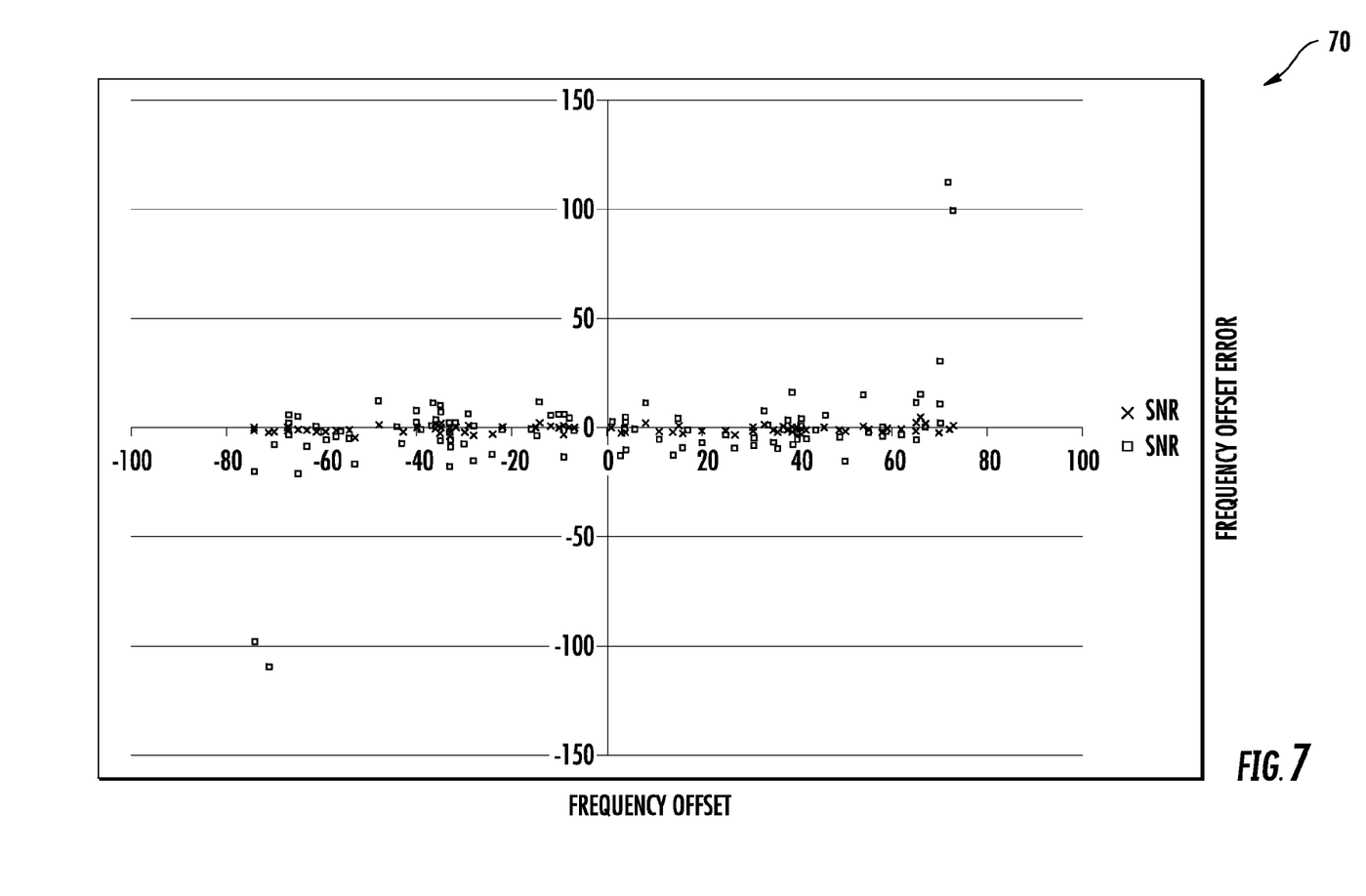
FIG. 7 is a chart illustrating performance of the HF communication system of FIG. 1.

Referring now to FIGS. 6-7, a chart 60 illustrates several typical approaches to transmitting a message comprising a data section having an orthogonal modulation of multi-symbol frames (140 Characters+16/32 bit CRC). This figure illustrates how a longer preamble and spreading the signal improves the SNR performance as observed by comparing 64-5 (64 is spreading amount, 5 is related to preamble length) to 256-71. Most of the approaches require more than 90 seconds for transmitting a 140 character message when SNR is low. Chart 70 demonstrates the frequency error performance of the HF communication system 10. Frequency error is the difference between the simulated frequency offset and the value determined by the demodulation process. Ideally, this curve should be all zeros. The data points labeled X are for a high SNR, and the data points labeled are for a much lower SNR. It can be seen that the frequency error is much higher at the lower SNR, which is why trying a multiplicity of hypothesized frequency offsets is advantageous to the system. Advantageously, the HF communication system 10 disclosed herein may provide for reduced air time for the first and second HF radio communications devices 11, 21, which will enhance battery life. Moreover, message errors caused by poor frequency offset estimate may be minimized by evaluation of multiple frequency estimates centered on an initial estimate.

Another aspect is directed to a method of operating an HF communication system 10 comprising a first HF radio communications device 11, and a second HF radio communications device 21. The method comprises operating the first HF radio communications device 11 to send a message 50 to the second HF radio communications device 21. The message 50 comprises a preamble portion 51, a variable length data portion 52 after the preamble portion and having a given ending point from among a plurality of potential ending points 53a-53f with each potential ending point being spaced apart from an adjacent potential ending point by a set quantity of digital data such as a set number of characters or bits, and a check portion 54 after the variable length data portion indicating an end of the message. The method further comprises operating the second HF radio communications device 21 to perform a decoding operation on the message 50 at a potential ending point 53a-53f, and perform a check operation on a potential check portion of the decoded message, and when the check operation is successful, recover the variable length data portion 52 from the decoded message, otherwise perform another decoding operation on the message at a next potential ending point, and perform another check operation on another potential check portion of the respective decoded message.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A high frequency (HF) communication system comprising:
a first HF radio communications device comprising a first HF radio transceiver and a first controller coupled thereto; and a second HF radio communications device comprising a second HF radio transceiver and a second controller coupled thereto;

said first controller being operable with said first HF radio transceiver and being configured to send a message to said second HF radio communications device, the message comprising:

a preamble portion;

a variable length data portion after the preamble portion and having a given ending point selected from among a plurality of potential ending points with each potential ending point being spaced apart from an adjacent potential ending point by a set quantity of digital data; and a check portion after the variable length data portion indicating an end of the message;

said second controller being operable with said second HF radio transceiver and being configured to perform a decoding operation on the message at a potential ending point, and perform a check operation on a potential check portion of the decoded message, and when the check operation is successful, recover the variable length data portion from the decoded message, otherwise perform another decoding operation on the message at a next potential ending point, and perform another check operation on another potential check portion of the respective decoded message.

2. The HF communication system of claim 1 wherein the set quantity of digital data comprises one of a set number of characters, or a set number of bits.

3. The HF communication system of claim 1 wherein said second controller is configured to determine an estimated time alignment and estimated frequency offset of the message based upon the preamble portion.

4. The HF communication system of claim 1 wherein said second controller is configured to perform each decoding operation based upon a forward error correction (FEC) decoding.

5. The HF communication system of claim 1 wherein the check portion comprises a cyclic redundancy check (CRC) portion; and wherein said second controller is configured to perform the check operation comprising a CRC operation.

6. The HF communication system of claim 1 wherein the set quantity of digital data comprises a uniform set quantity of digital data.

7. The HF communication system of claim 1 wherein said first controller is configured to append null characters to an end of the variable length data portion so that the message reaches the given ending point.

8. The HF communication system of claim 1 wherein said first controller is configured to generate the variable length data portion comprising text based communications.

9. The HF communication system of claim 1 wherein said first controller is configured to generate the message with the variable length data and check portions sequentially repeated a set number of times.

10. The HF communication system of claim 9 wherein said first controller is configured to determine the set number of times based upon at least one communication channel characteristic.

11. The HF communication system of claim 9 wherein said second controller is configured to perform a plurality of decoding operations on the message, each decoding operation being performed based upon the variable length data and check portions being sequentially repeated a respective number of times.

12. The HF communication system of claim 3 wherein said second controller is configured to perform a plurality of decoding operations on the message at the potential ending point, the plurality of decoding operations being performed at a plurality of estimated frequency offsets for the message.

13. The HF communication system of claim 12 wherein said second controller is configured to perform a plurality of check operations on the potential check portion of the decoded message for the plurality of decoding operations.

14. A high frequency (HF) radio communications device operable to communicate with a HF radio transmission device, the HF radio transmission device operable to send a message comprising a preamble portion, a variable length data portion after the preamble portion and having a given ending point selected from among a plurality of potential ending points with each potential ending point being spaced apart from an adjacent potential ending point by a set quantity of digital data, and a check portion after the variable length data portion indicating an end of the message, the HF radio communications device comprising:

an HF radio receiver; and a controller being operable with said HF radio receiver and being configured to perform a decoding operation on the message at a potential ending point, and perform a check operation on a potential check portion of the decoded message, and when the check operation is successful, recover the variable length data portion from the decoded message, otherwise perform another decoding operation on the message at a next potential ending point, and perform another check operation on another potential check portion of the respective decoded message.

15. The HF radio communications device of claim 14 wherein the set quantity of digital data comprises one of a set number of characters, or a set number of bits.

16. The HF radio communications device of claim 14 wherein said controller is configured to determine an estimated time alignment and estimated frequency offset of the message based upon the preamble portion.

17. The HF radio communications device of claim 14 wherein said controller is configured to perform each decoding operation based upon a forward error correction (FEC) decoding.

18. The HF radio communications device of claim 14 wherein the check portion comprises a cyclic redundancy check (CRC) portion; and wherein said controller is configured to perform the check operation comprising a CRC operation.

19. The HF communications device of claim 14 wherein the HF radio transmission device is operable to generate the message with the variable length data and check portions sequentially repeated a set number of times.

20. The HF radio communications device of claim 16 wherein said controller is configured to perform a plurality of decoding operations on the message at the potential ending points, the plurality of decoding operations being performed at a plurality of estimated frequency offsets for the message.

21. The HF communications device of claim 19 wherein the HF radio transmission device is operable to determine the set number of message repeats based upon at least one communication channel characteristic.

22. The HF communications device of claim 19 wherein said controller is configured to perform a plurality of decoding operations on the message, each decoding operation being performed based upon the variable length data and check portions being sequentially repeated a respective number of times.

23. The HF radio communications device of claim 20 wherein said controller is configured to perform a plurality of check operations on the potential check portion of the decoded message for the plurality of decoding operations.

24. A method of operating a high frequency (HF) radio communications device communicating with another HF radio communications device, the other HF radio communications device sending a message comprising a preamble portion, a variable length data portion after the preamble portion and having a given ending point selected from among a plurality of potential ending points with each potential ending point being spaced apart from an adjacent potential ending point by a set quantity of digital data, and a check portion after the variable length data portion indicating an end of the message, the method comprising:
operating an HF radio transceiver and a controller in the HF radio communications device to
perform a decoding operation on the message at a potential ending point, and perform a check operation on a potential check portion of the decoded message, and
when the check operation is successful, recover the variable length data portion from the decoded message, otherwise perform another decoding operation on the message at a next potential ending point, and perform another check operation on another potential check portion of the respective decoded message.

25. The method of claim 24 wherein the set quantity of digital data comprises one of a set number of characters, or a set number of bits.

26. The method of claim 24 further comprising operating the HF radio transceiver and the controller to determine an estimated time alignment and estimated frequency offset of the message based upon the preamble portion.

27. The method of claim 24 further comprising operating the HF radio transceiver and the controller to perform each decoding operation based upon a forward error correction (FEC) decoding.

28. The method of claim 24 wherein the check portion comprises a cyclic redundancy check (CRC) portion; and further comprising operating the HF radio transceiver and the controller to perform the check operation comprising a CRC operation.

29. The method of claim 24 wherein the set quantity of digital data comprises a uniform set quantity of digital data.

30. The method of claim 24 wherein the other HF radio communications device appends null characters to an end of the variable length data portion so that the message reaches the given ending point.

31. The method of claim 24 wherein the other HF radio communications device generates the message with the variable length data and check portions sequentially repeated a set number of times.

32. The method of claim 26 further comprising operating the HF radio transceiver and the controller to perform a plurality of decoding operations on the message at the potential ending point, the plurality of decoding operations being performed at a plurality of estimated frequency offsets for the message.

33. The method of claim 31 wherein the other HF radio communications device determines the set number of times based upon at least one communication channel characteristic.

34. The method of claim 31 further comprising operating the HF radio transceiver and the controller to perform a plurality of decoding operations on the message, each decoding operation being performed based upon the variable length data and check portions being sequentially repeated a respective number of times.

35. The method of claim 32 further comprising operating the HF radio transceiver and the controller to perform a plurality of check operations on the potential check portion of the decoded message for the plurality of decoding operations.

* * * * *